United States Patent
Choi et al.

(10) Patent No.: US 9,810,197 B2
(45) Date of Patent: Nov. 7, 2017

(54) APPARATUS FOR MOVING BLADES OF A WING TURBINE AND WIND TURBINE INCLUDING THE SAME

(71) Applicant: SAMSUNG HEAVY IND. CO., LTD., Seoul (KR)

(72) Inventors: Jaeyeon Choi, Geoje-si (KR); Tae Won Yoon, Geoje-si (KR); Shimjith Manappatty, Geioje-si (KR)

(73) Assignee: SAMSUNG HEAVY IND. CO., LTD., Seoul (KR)

( * ) Notice: Subject to any disclaimer, the term of this patent is extended or adjusted under 35 U.S.C. 154(b) by 462 days.

(21) Appl. No.: 14/372,740

(22) PCT Filed: Jan. 16, 2013

(86) PCT No.: PCT/KR2013/000326
§ 371 (c)(1),
(2) Date: Jul. 16, 2014

(87) PCT Pub. No.: WO2013/109046
PCT Pub. Date: Jul. 25, 2013

(65) Prior Publication Data
US 2015/0300313 A1    Oct. 22, 2015

(30) Foreign Application Priority Data
Jan. 17, 2012   (KR) .................. 10-2012-0005260

(51) Int. Cl.
*F03D 13/10* (2016.01)
*F03D 1/00* (2006.01)
(Continued)

(52) U.S. Cl.
CPC ........... *F03D 1/003* (2013.01); *F03D 1/0658* (2013.01); *F03D 1/0675* (2013.01); *F03D 13/10* (2016.05);
(Continued)

(58) Field of Classification Search
CPC ........ F03D 1/003; F03D 80/70; F03D 1/0675; F03D 1/001; F03D 1/0658; Y02E 10/728;
(Continued)

(56) References Cited

U.S. PATENT DOCUMENTS

2007/0290426 A1   12/2007   Trede et al.
2010/0086407 A1   4/2010    Holmoy
(Continued)

FOREIGN PATENT DOCUMENTS

| EP | 2312152 A2 | 4/2011 |
|---|---|---|
| JP | 4699571 B1 | 6/2011 |
| KR | 1020040016986 A | 2/2004 |
| KR | 1020050007542 A | 1/2005 |
| KR | 1020090083336 A | 8/2009 |
| KR | 1020100110575 A | 10/2010 |

(Continued)

OTHER PUBLICATIONS

Extended European Search Report dated Aug. 5, 2015, which issued in European Application No. 13738768.4.

*Primary Examiner* — Sarang Afzali
*Assistant Examiner* — Ruth G Hidalgo-Hernandez
(74) *Attorney, Agent, or Firm* — McDermott, Will & Emery LLP

(57) ABSTRACT

An apparatus for moving blades of a wind turbine is provided. The apparatus for moving blades for a wind turbine includes: wire connectors formed at a plurality of blades; and a pair of wires that are attachable and detachable to and from first to third wire connectors so as to connect the first and second wire connectors formed at first and second blades and a third wire connector formed at the third blade.

13 Claims, 17 Drawing Sheets

(51) Int. Cl.
*F03D 1/06* (2006.01)
*F03D 80/70* (2016.01)
*F03D 80/50* (2016.01)

(52) U.S. Cl.
CPC .............. *F03D 80/50* (2016.05); *F03D 80/70* (2016.05); *F05B 2230/61* (2013.01); *F05B 2230/80* (2013.01); *F05B 2240/916* (2013.01); *Y02E 10/721* (2013.01); *Y02E 10/728* (2013.01); *Y02P 70/523* (2015.11); *Y10T 29/37* (2015.01); *Y10T 29/49318* (2015.01)

(58) Field of Classification Search
CPC ................. Y02E 10/721; Y02P 70/523; F05B 2240/916; F05B 2230/61; F05B 2230/80; Y10T 29/49336; Y10T 29/53
See application file for complete search history.

(56) References Cited

U.S. PATENT DOCUMENTS

| | | | |
|---|---|---|---|
| 2010/0135797 A1* | 6/2010 | Nies | ........................ F03D 1/003 416/9 |
| 2010/0135808 A1 | 6/2010 | Wiebrock et al. | |
| 2010/0139062 A1 | 6/2010 | Reed et al. | |
| 2010/0139063 A1 | 6/2010 | Goodwin | |
| 2010/0143136 A1 | 6/2010 | Daniels et al. | |

FOREIGN PATENT DOCUMENTS

| | | |
|---|---|---|
| KR | 1020100134531 A | 12/2010 |
| KR | 1020110037897 A | 4/2011 |
| WO | WO-2011/095167 A2 | 8/2011 |

* cited by examiner

APPARATUS FOR MOVING BLADES OF A WIND TURBINE AND WIND TURBINE INCLUDING THE SAME

TECHNICAL FIELD

The present invention relates to a wind turbine, and more particularly, to an apparatus for moving blades of a wind turbine, a method for repairing pitch bearings using the same, and a wind turbine including the same.

BACKGROUND ART

FIG. 1 is a perspective view of a wind turbine. As can be seen in FIG. 1, a wind turbine 1 that generates power by wind, which is a form of natural energy, includes a nacelle 3 installed on top of a tower 2, a hub 4 installed in front of the nacelle 3, and blades 5 installed at the hub 4. The wind turbine is generally a three-bladed design. That is, three blades 5a, 5b, and 5c are installed at the hub 4 at 120-degree intervals.

The nacelle 3 is connected to the hub 4 by a main shaft adapted to rotate together with the hub 4, and a speed-up gear connected to the main shaft and a generator connected to the speed-up gear are installed inside the nacelle 3.

The wind turbine 1 produces electricity using a generator as the main shaft rotates with the rotation of the blades 5, and torque of the speed-up gear connected to the main shaft is transferred to the generator inside the nacelle.

The blades 5 of the wind turbine 1 are connected to the hub while being connected to pitch bearings in order to change their angle of attack according to the wind speed. In general, the pitch of a blade can be changed in the range of 0 to 90 degrees.

Since the pitch of the blades 5 can be changed in the range of 0 to 90 degrees, the inner rings of the pitch bearings, which are worn by internal gears of the pitch bearings, should also be able to be changed in the range of 0 to 90 degrees, when the pitch of the blades 5 is changed.

When the inner rings of the pitch bearings of the blades 5 are worn in this limited range, the area of contact between the internal gears of the pitch bearings and the inner rings of the pitch bearings is changed from the range of 0 to 90 degrees (first section) to a range of 90 to 180 degrees (second section), a range of 180 to 270 degrees (third section), or a range of 270 to 360 degrees (fourth section), thereby extending the lifespan of the pitch bearings.

A pitch bearing repair process for changing the positions of the internal gears of the pitch bearings of the blades 5 consists of a process of removing all of the three blades 5a, 5b, and 5c from the hub 4, changing the positions of the inner rings of the pitch bearings, and then reassembling the three blades 5a, 5b, and 5c to the hub 4.

Since the three blades 5a, 5b, and 5c connected to the hub 4 are large, the process of removing the blades 5a, 5b, and 5c from the hub 4 and reassembling them is not easy and it takes a lot of time for repair.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide an apparatus and method for moving blades, which make it easy to remove blades of a wind turbine and move them.

Furthermore, the present invention has been made in an effort to provide an apparatus and method for moving blades, which allow the repair of pitch bearings of a wind turbine and reduce repair time.

Technical Solution

An exemplary embodiment of the present invention provides an apparatus for moving blades of a wind turbine, the apparatus including: wire connectors formed at a plurality of blades; and a pair of wires that are attachable and detachable to and from first to third wire connectors so as to connect first and second wire connectors formed at the first and second blades and a third wire connector formed at the third blade.

The first to third wire connectors include first protrusions each having a first hole that are formed at root portions of the first to third blades, and to which the wires are connected.

The first protrusions may be formed in pairs.

A pair of first protrusions may be arranged at 180-degree intervals at the root portion of a blade.

The pair of first protrusions may be formed on an outer or inner peripheral surface of the root portion of the blade.

The first holes formed in the pair of first protrusions may be open in a direction parallel to the direction in which the blade extends.

The wire connectors may further include second protrusions each having a second hole that is formed at a hub so as to be arranged in parallel with the pair of first protrusions.

The second protrusions may be fixed in position on a horizontal center line of the blades in a direction parallel to the front of the root portions of the blades.

The pair of wires to be connected to the first and second wire connectors may be connected to a pair of first protrusions of the first and second wire connectors located on the upper side.

The pair of wires connected to the pair of first protrusions of the first and second wire connectors may be connected to a pair of protrusions of the third wire connector.

The pair of wires may be adapted to pass through the second holes of the third wire connectors.

The pair of wires may be equal in length.

The pair of wires connected between the first and third wire connectors and between the second and third wire connectors may be arranged to not cross each other.

Coupling loops may be formed at opposite ends of the pair of wires.

Another exemplary embodiment of the present invention provides a wind turbine including the above-described blade moving apparatus.

Another exemplary embodiment of the present invention provides a method for repairing pitch bearings of a wind turbine using the above-described apparatus for moving blades for the wind turbine, the method including: (a) locating first and second blades higher than a third blade (S101); (b) connecting a pair of wires between first and third wire connectors and between second and third wire connectors (S102); (c) removing a third blade from a hub (S103); (d) moving the third blade in a direction away from the hub by changing a pitch of the first and second blades (S104); (e) rotating the pitch bearing of the third blade (S105); (f) moving the third blade in a direction toward the hub (S106); (g) connecting the third blade to the hub (S107); and (h) removing the pair of wires from between the first and third wire connectors and from between the second and third wire connectors (S108).

In (a), the first blade and the second blade may be placed bilaterally symmetrically with respect to the third blade.

In (b), the first wire and the second wire may be placed bilaterally symmetrically with respect to the vertical central axis of the wind turbine.

In (d) and (f), the pitch of the first blade and the pitch of the second blade may be turned in opposite directions to move the third blade downward.

Advantageous Effects

According to an embodiment of the present invention, blades of a wind turbine can be easily moved.

According to an embodiment of the present invention, a pitch bearing of a wind turbine can be easily repaired using an apparatus for moving blades of a wind turbine.

EXPLANATION OF REFERENCE NUMERALS

Figure 1:
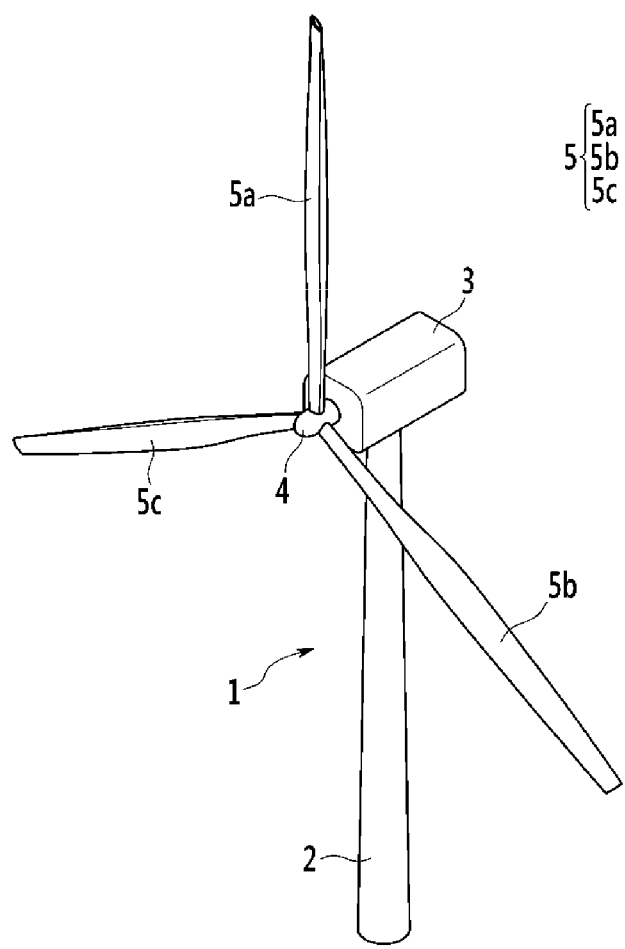
FIG. 1 is a perspective view of a wind turbine.

| 1 wind turbine | 2 tower |
| 3 nacelle | 4 hub |
| 5 blade | 5a first blade |
| 5b second blade | 5c third blade |
| 6 root portion | 7a 7b bolt |
| 8a 8b nut | 10 blade moving apparatus |
| 11 wire connector | 11a first wire connector |
| 11b second wire connector | 11c third wire connector |
| 12 first protrusion | 14 second protrusion |
| 20 wire | 20a first wire |
| 20b second wire | |

[Mode For Invention]

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
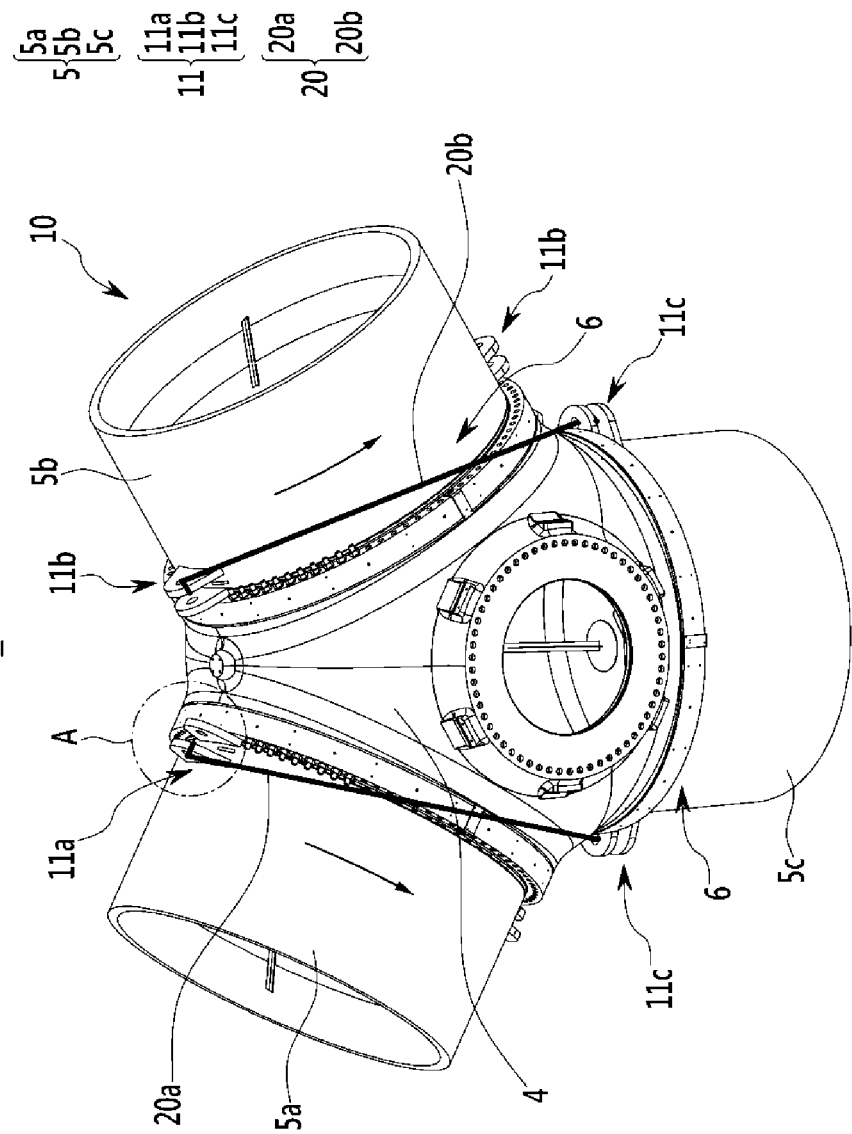
FIG. 2 is a partial perspective view of a wind turbine equipped with an apparatus for moving blades of the wind turbine according to an exemplary embodiment of the present invention.
Figure 3:
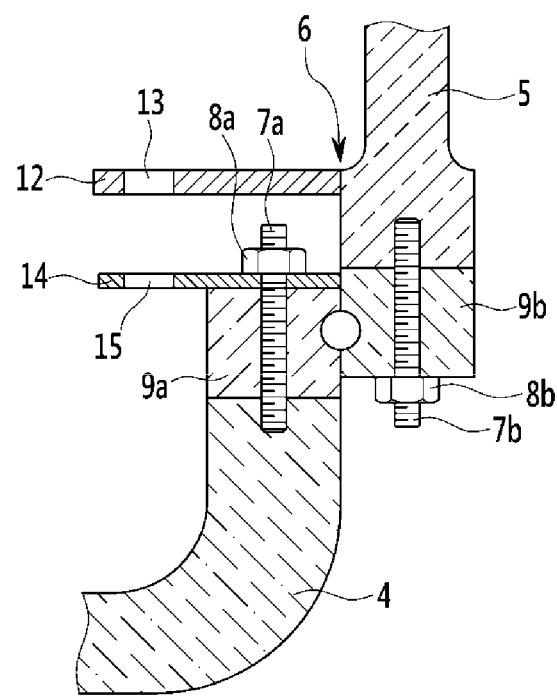
FIG. 3 is a cross-sectional view of portion A in FIG. 2.
Figure 4:
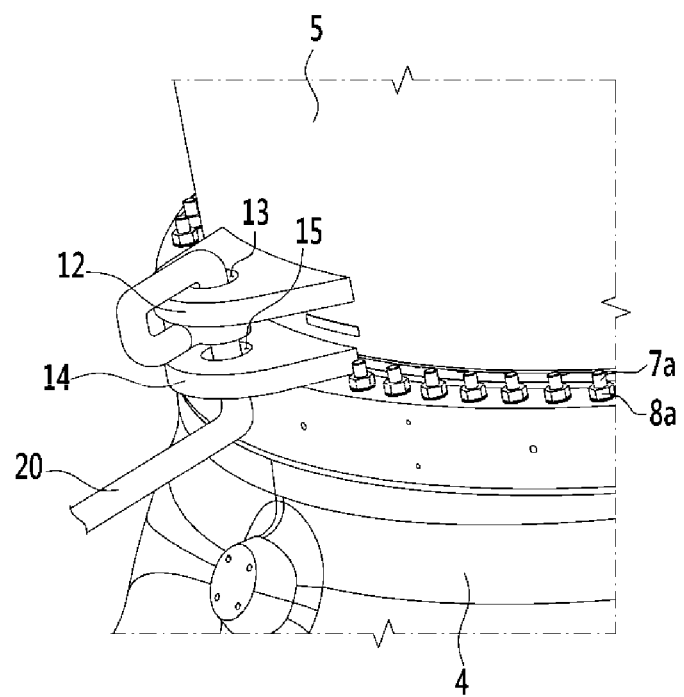
FIG. 4 is an enlarged view of portion A in FIG. 2.
Figure 5:
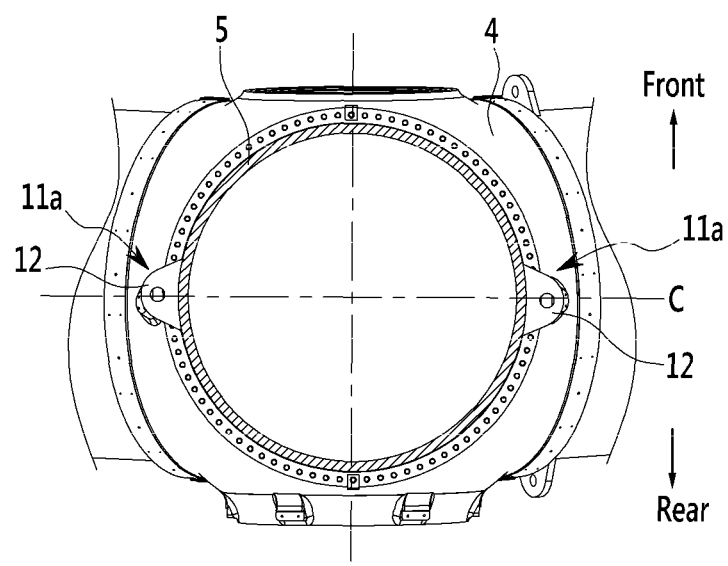
FIG. 5 is a partial plan view of FIG. 2 as viewed from above.
Figure 6:
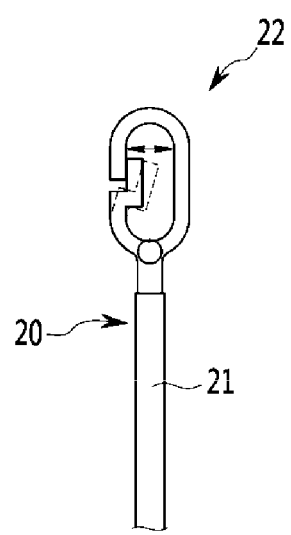
FIG. 6 is a view illustrating one end of a wire installed at a wire connector of an apparatus for moving blades of a wind turbine according to an exemplary embodiment of the present invention.
Figure 7:
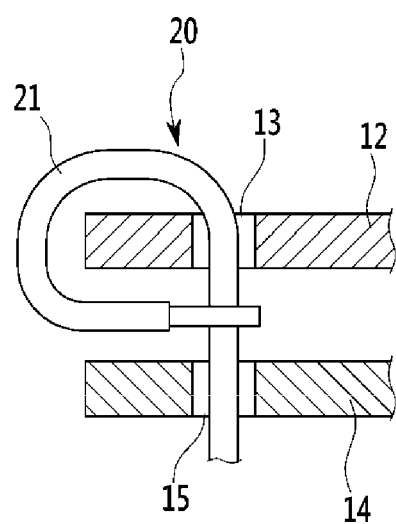
FIG. 7 is a view illustrating one end of a wire being installed at a wire connector of an apparatus for moving blades for a wind turbine according to an exemplary embodiment of the present invention.

FIG. 2 is a partial perspective view of a wind turbine equipped with an apparatus for moving blades of the wind turbine according to an exemplary embodiment of the present invention. FIG. 3 is a cross-sectional view of portion A in FIG. 2. FIG. 4 is an enlarged view of portion A in FIG. 2. FIG. 5 is a partial plan view of FIG. 2 as viewed from above. FIG. 6 is a view illustrating one end of a wire installed at a wire connector of an apparatus for moving blades for a wind turbine according to an exemplary embodiment of the present invention. FIG. 7 is a view illustrating one end of a wire being installed at a wire connector of an apparatus for moving blades for a wind turbine according to an exemplary embodiment of the present invention.

In the present exemplary embodiment, the wind turbine includes first to third blades 5a, 5b, and 5c clockwise from top left in FIG. 2. Wire connectors 11 to be installed at the first to third blades 5a, 5b, and 5c are hereinafter referred to as first to third wire connectors 11a, 11b, and 11c. The wire connectors 11 collectively refer to all wire connectors 11 unless they are specified as the first to third wire connectors 11a, 11b, and 11c.

A blade moving apparatus 10 according to an exemplary embodiment of the present invention is a device capable of removing blades 5 of a wind turbine 1 from a hub, with the blades 5 hanging in the air, and moving them up and down. The blade moving apparatus 10 of the wind turbine 1 according to an exemplary embodiment of the present invention can be used when removing the blades 5 from the hub 4 and then connecting them again to the hub 4, in order to move the area of contact between internal gears and the inner rings of pitch bearings for turning the pitch of the blades 5 from one side of the inner rings of the pitch bearings, for example, a first section, to the other side of the inner rings, for example, second to fourth sections.

To this end, the blade moving apparatus 10 according to an exemplary embodiment of the present invention includes the wire connectors 11 formed at root portions 6 of the blades 5 and a pair of wires 20. The pair of wires 20 are formed to be attachable and detachable to and from the first to third wire connectors 11a, 11b, and 11c so as to interconnect the first and second wire connectors 11a and 11b formed at the first and second blades 5a and 5b located on the upper side and the third wire connector 11c formed at the third blade 5c located on the lower side.

More specifically, the wire connectors 11 of the blade moving apparatus 10 according to an exemplary embodiment of the present invention are portions to which the wires 20 can be connected that are formed at the root portions 6 of the blades 5, i.e., the ends of the blades 5 adjacent to the hub 4. The wire connectors 11 may be respectively formed at the plurality of blades 5a, 5b, and 5c that are connected to the hub 4 of the wind turbine 1.

Referring to FIGS. 2 to 4, the wire connectors 11 include first protrusions 12 and second protrusions 14. The first protrusions 12 and the second protrusions 14 may be formed in pairs, and a pair of first protrusions 12 and a pair of second protrusions 14 are arranged at 180-degree intervals at the blade 5 and the root portion 6, respectively, Although the present exemplary embodiment illustrates first protrusions 12 and second protrusions 14 formed in pairs, three or more first protrusions 12 and three or more second protrusions 14 may be formed.

If three or more first protrusions 12 and three or more second protrusions 14, for example, four first protrusions and four second protrusions, are formed at equal intervals, they may be spaced apart at 90-degree intervals on the outer periphery of the root portion 6 of the blade 5.

Referring to FIG. 3, a first protrusion 12 is made of a plate-like member that extends outward of the blade 5 from the outer periphery of the root portion 6 of the blade 5.

The first protrusion 12 may be formed by joining a plate-like member, which is formed separately from the blade 5, to the blade 5 by a joining method such as bonding.

A first hole 13 is formed in the first protrusion 12. The first hole 13 is a component for passing the wire 20 through, and is configured to be open in a direction parallel to the direction where the blade 5 extends.

Because the first protrusion 12 is joined to the blade 5, it is formed to be rotatable together with the blade 5 as the blade 5 rotates.

The second protrusion 14 is formed at the hub 4, in parallel with the first protrusion 12. Referring to FIG. 3, the second protrusion 14 may be secured to a bolt 7a by a fastening member such as a nut 8a when the bolt 7a protruding from the outer ring 9a of a pitch bearing in the direction where the blade 5 extends is fitted to a hole formed at one side of the second protrusion 14.

A second hole 15 is likewise formed in the second protrusion 14, in parallel with the first protrusion 12. The second hole 15 of the second protrusion 14 may be used for the purpose of guiding the wire 20 in the process of repairing the pitch bearing of the blade 5.

Referring to FIG. 5, the second protrusions 14 are fixed in position on the horizontal center line C of the blade 5 in a direction parallel to the front of the blade 5 to which the wind blows.

The reason why the second protrusions 14 are located on the horizontal center line C of the blade root portion 6 is to prevent the center of gravity of the blade 5 from being eccentric while the blade 5 is hanging by the pair of wires 20a and 20b by making the wire 20 support the blade 5 at the center in a front-back direction of the blade 5 when the wire 20, extended through the second protrusions 14, supports both sides of the blade 5.

Each of the pair of wires 20 includes a longitudinally extended wire body 21 and a coupling loop 22 at the end of the wire body 21.

The wire body 21 may be made of a line of a plurality of twisted wires that are rigid enough to support the blade 5 which is heavy.

The coupling loop 22 may be made of a known loop-shaped fastening member of which one side can be elastically opened and closed.

As shown in FIG. 7, the ends of the pair of wires 20 may be connected to the wire connectors 11 in such a manner that the coupling loop 22 of the wire 20 passing through the first hole 13 is fastened to one side of the wire not passing through the first hole 13, with the coupling loop 22 being turned from outside the first protrusion 12.

If the wire 20 passes only through the first hole 13 but not through the second hole 15 and then is connected to one side of the wire 20, the position of the wire 20 may be moved along with the blade 5 when the blade 5 rotates.

Figure 8:
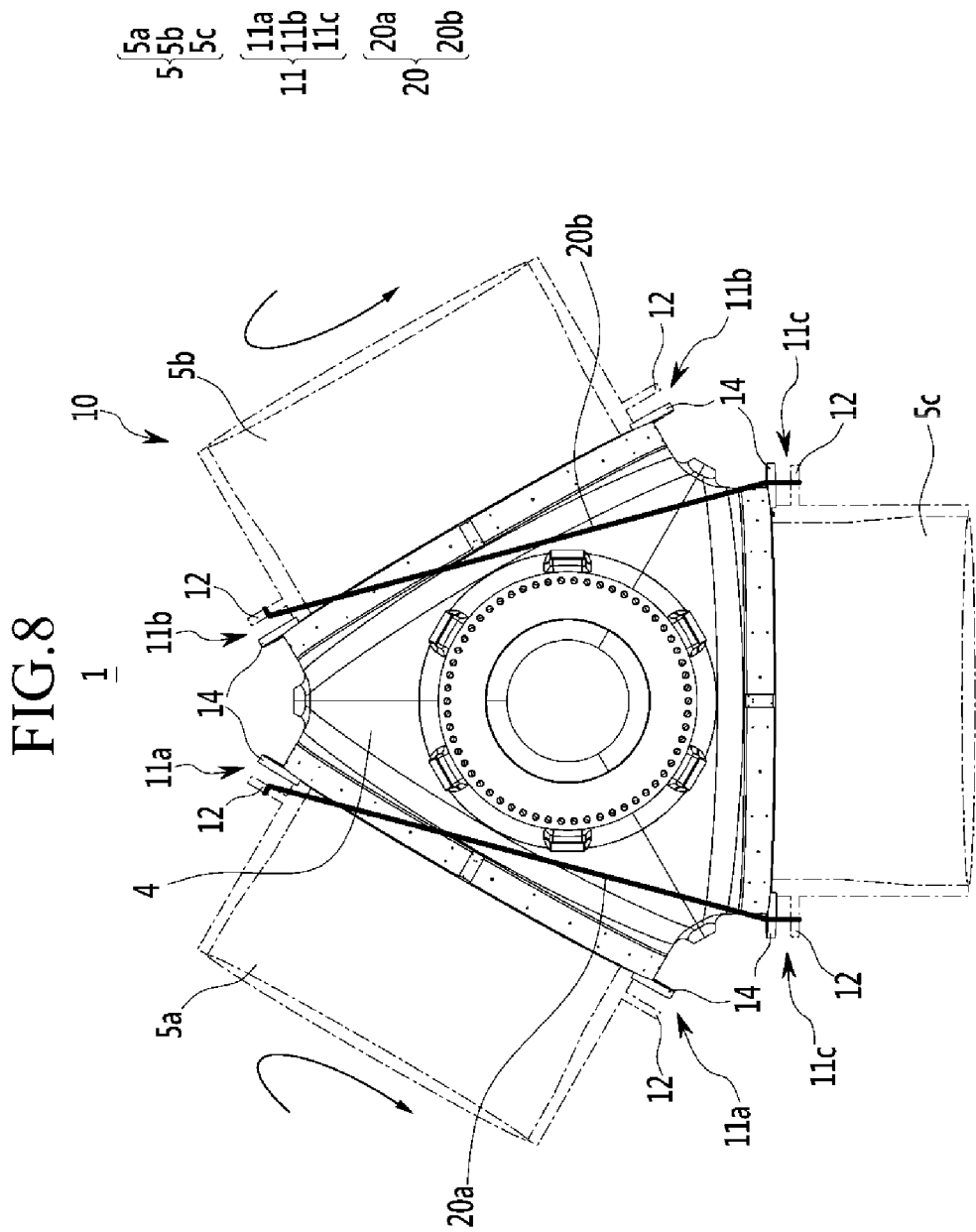
FIG. 8 is a view illustrating wires being installed at wire connectors of a blade moving apparatus of a wind turbine according to an exemplary embodiment of the present invention.

FIG. 8 is a view illustrating wires 20 being installed at wire connectors 11 of a blade moving apparatus 10 of a wind turbine 1 according to an exemplary embodiment of the present invention. FIG. 8 is a view of the hub of the wind turbine as viewed from the rear.

Referring to FIG. 8, the wires 20 are installed at the wire connectors 11 in order to repair the pitch bearings of the wind turbine by using the blade moving apparatus 10 of the wind turbine according to an exemplary embodiment of the present invention.

In the wind turbine, the first blade 5a and the second blade 5b are located above the third blade 5c.

Referring to FIG. 8, the first blade 5a and the second blade 5b are arranged to be bilaterally symmetrical with respect to the hub 4, and the third blade 5c is placed in an up-down direction perpendicular to the bottom surface of the third blade 5c.

Once the first to third blades 5a, 5b, and 5c are placed, the pitch bearing of the third blade 5c can be repaired using the blade moving apparatus 10. If it is desired to repair the first blade 5a, a repair on the first blade 5a can be carried out after locating the first blade 5a on the lower side and locating the second and third blades 5b and 5c above the first blade 5a to be bilaterally symmetrical.

More specifically, once the first to third blades 5a, 5b, and 5c are placed as shown in FIG. 8, the pair of wires 20a and 20b are connected between the first and third wire connectors 11a and 11c of the first and third blades 5a and 5c and between the second and third wire connectors 11b and 11c of the second and third blades 5b and 5c. In the description of FIG. 8 that follows, the wire to be connected between the first and third wire connectors 11a and 11c is referred to as a first wire 20a, and the wire to be connected between the second and third wire connectors 11b and 11c is referred to as a second wire 20b.

Referring to FIG. 8, the upper end of the first wire 20a, one of the pair of wires, is connected to the first protrusion 12 of the first wire connector 11a located on the upper side, and the lower end of the first wire 20a is connected to the first protrusion 12 of the third wire connector 11c formed at the left side of the third blade 5c as viewed from FIG. 8.

The first protrusion 12 on the upper side is located above the blade root portion 6. The reason why the first wire 20a is connected to the first protrusion 12 of the first wire connector 11a located on the upper side is to make the first wire 20a longer while the first wire 20a is connected between the first wire connector 11a and the third wire connector 11c.

According to an exemplary embodiment of the present invention, the third blade 5c connected to the first wire 20a is moved downward by rotating the first blade 5a while the first wire 20a is connected to the first wire connector 11a. The first wire 20a should be made longer to keep the moving distance of the third blade 5c sufficiently long.

If the first wire 20a is connected to one of the first protrusions 12 of the third wire connector 11c while connected to the first protrusion 12 on the lower side, i.e., the other first protrusion 12 of the first wire connector 11a, the third blade 5c may not be moved smoothly because the first wire 20a is too short.

The configuration for connecting the first wire 20a to the first protrusion 12 has been described with reference to FIG. 7, so a detailed description thereof will be omitted.

The upper end of the first wire 20a is extended downward from the first protrusion 12 of the first wire connector 11a without passing through the second protrusion 14 when connected to the first protrusion 12, and the lower end of the first wire 20a is connected to the first protrusion 12 of the third wire connector 11c on the left side of the third blade 5c after passing through the second hole 15 formed at the second protrusion 14.

The first wire 20a connected between the first wire connector 11a and the third wire connector 11c to maintain tension between the first wire connector 11a and the third wire connector 11c.

In a similar manner to the first wire 20a, the second wire 20b connected between the second wire connector 11b and the third wire connector 11c is connected to the first protrusion 12 of the second wire connector 11b located on the upper side and the first protrusion 12 of the third wire connector 11c formed on the right side of the third blade 5c.

According to an exemplary embodiment of the present invention, the first wire 20a and the second wire 20b are equal in length. The first wire 20a and the second wire 20b should be equal in length in order to make the third blade 5c move bilaterally symmetrically, thereby facilitating the movement of the third blade 5c without making the center of gravity eccentric.

The first and second wires 20a and 20b connected between the first and third wire connectors 11a and 11c and between the second and third wire connectors 11b and 11c are arranged to not cross each other.

Accordingly, the first wire 20a and the second wire 20b are formed to be bilaterally symmetrical with respect to the center of vertical rotation of the blades. As described above, the first wire 20a and the second wire 20b should be formed to be bilaterally symmetrical in order to move the third blade 5c up and down in a stable way without shifting the center of gravity of the third blade 5c to the left or right.

Figure 9:
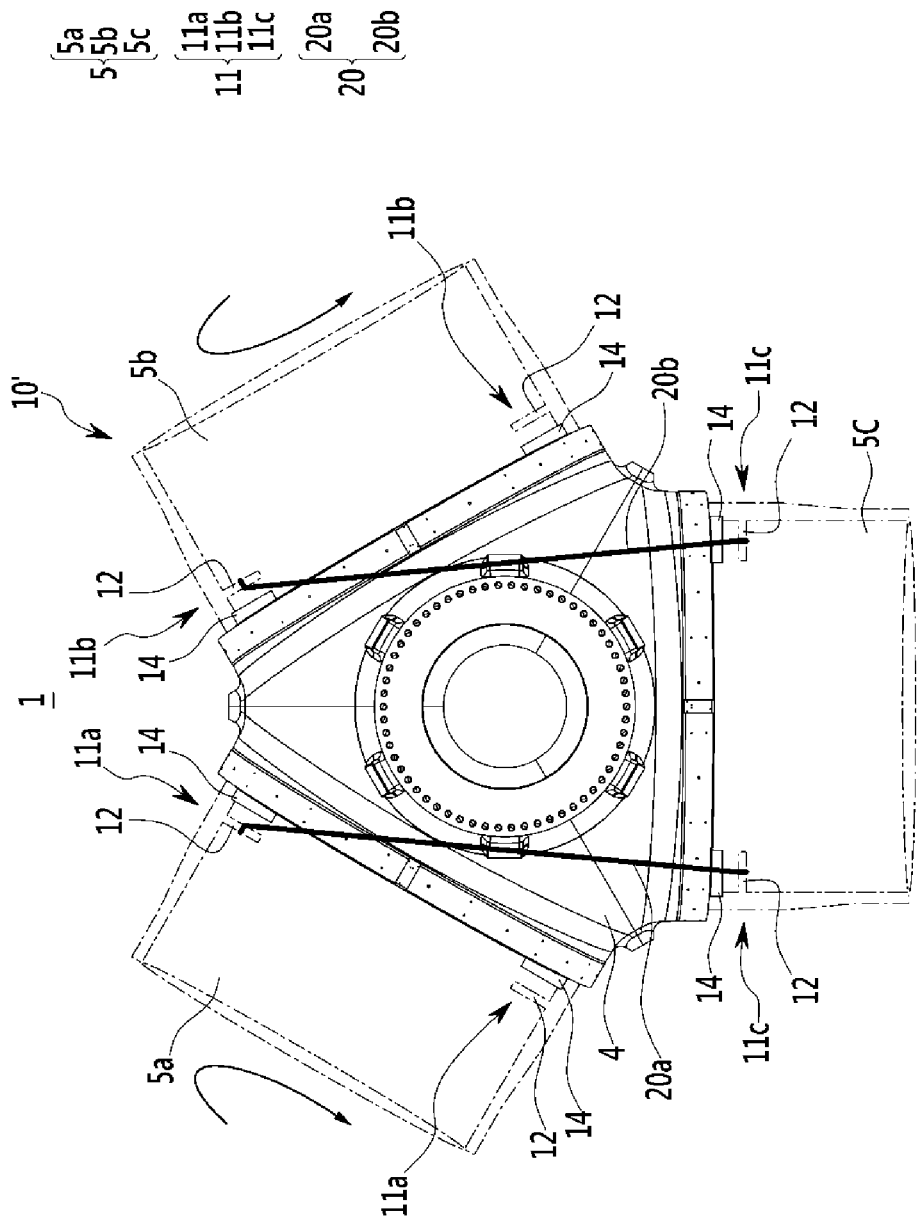
FIG. 9 is a view illustrating wires being installed at wire connectors of a blade moving apparatus of a wind turbine according to another exemplary embodiment of the present invention.
Figure 10:
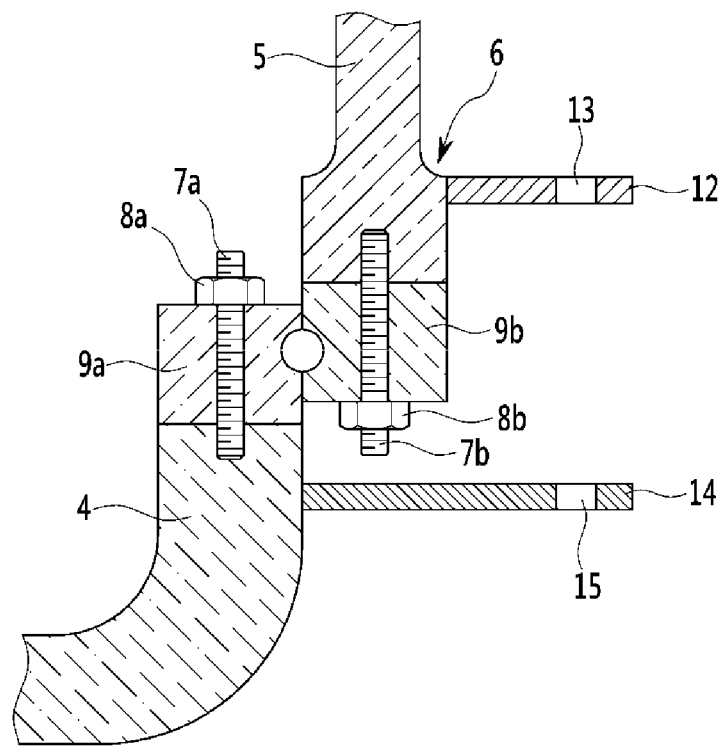
FIG. 10 is a view illustrating wire connectors of a blade moving apparatus of a wind turbine according to another exemplary embodiment of the present invention.

FIG. 9 is a view illustrating wires being installed at wire connectors of a blade moving apparatus of a wind turbine according to another exemplary embodiment of the present invention. FIG. 10 is a cross-sectional view of wire connectors of a blade moving apparatus of a wind turbine according to another exemplary embodiment of the present invention.

According to the current exemplary embodiment of the present invention, in a blade moving apparatus 10' installed at the blades 5 and hub 4 of the wind turbine 1, the first protrusions 12 and second protrusions 14 of the wire connectors 11 may be located inside the blades 5 and the hub 4.

More specifically, referring to FIG. 9 and FIG. 10, the blade moving apparatus 10' of the power turbine 1 according to the current exemplary embodiment of the present invention has the same configuration as the foregoing exemplary embodiment, except that the first to third wire connectors 11a, 11b, and 11c are located inside the blades 5 and hub 4 of the power turbine 1.

When the first protrusions 12 and second protrusions 14 of the first to third wire connectors 11a to 11c are formed on the inner peripheral surfaces of the blades 5 and the inner sides of the hub 4, the first wire 20a connected between the first and third wire connectors 11a and 11c and the second wire 20b connected between the second and third wire connectors 11b and 11c are located inside the blades 5 and the hub 4.

Since the inside of the root portions 6 of the blades 5 and the internal space of the hub 4 are spatially connected, configuring the blade moving apparatus 10' according to another exemplary embodiment of the present invention enables a worker to carry out the connection of the first wire 20a and the second wire 20b within the power turbine without going out of the blades 5 and the hub 4.

Now, a method for repairing pitch bearings of a wind turbine using a blade moving apparatus of the wind turbine having the above-explained configuration will be described.

Figure 11:
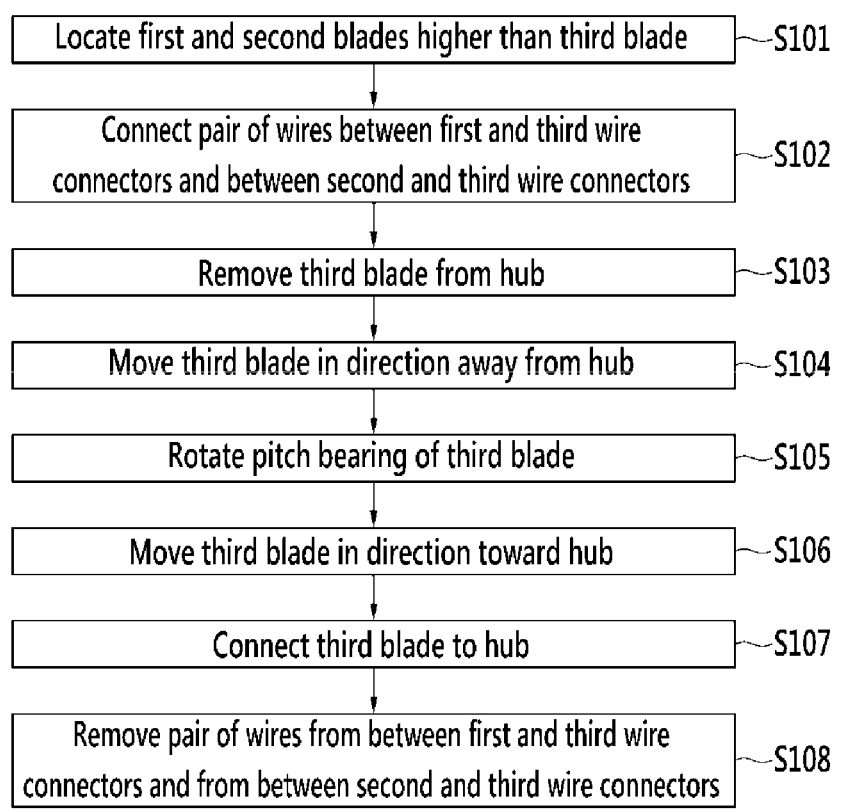
FIG. 11 is a flowchart of a method for repairing pitch bearings of a wind turbine according to an exemplary embodiment of the present invention.

FIG. 11 is a flowchart of a method for repairing pitch bearings of a wind turbine according to an exemplary embodiment of the present invention. FIG. 12 to FIG. 17 are views illustrating a process of repairing pitch bearings of a wind turbine using a blade moving apparatus of the wind turbine according to an exemplary embodiment of the present invention. FIG. 12 to FIG. 17 are views of the hub and blade root portions of the wind turbine as viewed from the rear.

Referring to FIG. 11, the method for repairing pitch bearings of a wind turbine according to an exemplary embodiment of the present invention includes: (a) locating first and second blades higher than a third blade (S101); (b) connecting a pair of wires between first and third wire connectors and between second and third wire connectors (S102); (c) removing a third blade from a hub (S103); (d) moving the third blade in a direction away from the hub by turning the pitch of the first and second blades (S104); (e) rotating the pitch bearing of the third blade (S105); (f) moving the third blade in a direction toward the hub (S106); (g) connecting the third blade to the hub (S107); and (h) removing the pair of wires from between the first and third wire connectors and from between the second and third wire connectors (S108). The process of repairing the pitch bearing of the third blade according to the present exemplary embodiment will now be described.

Figure 12:
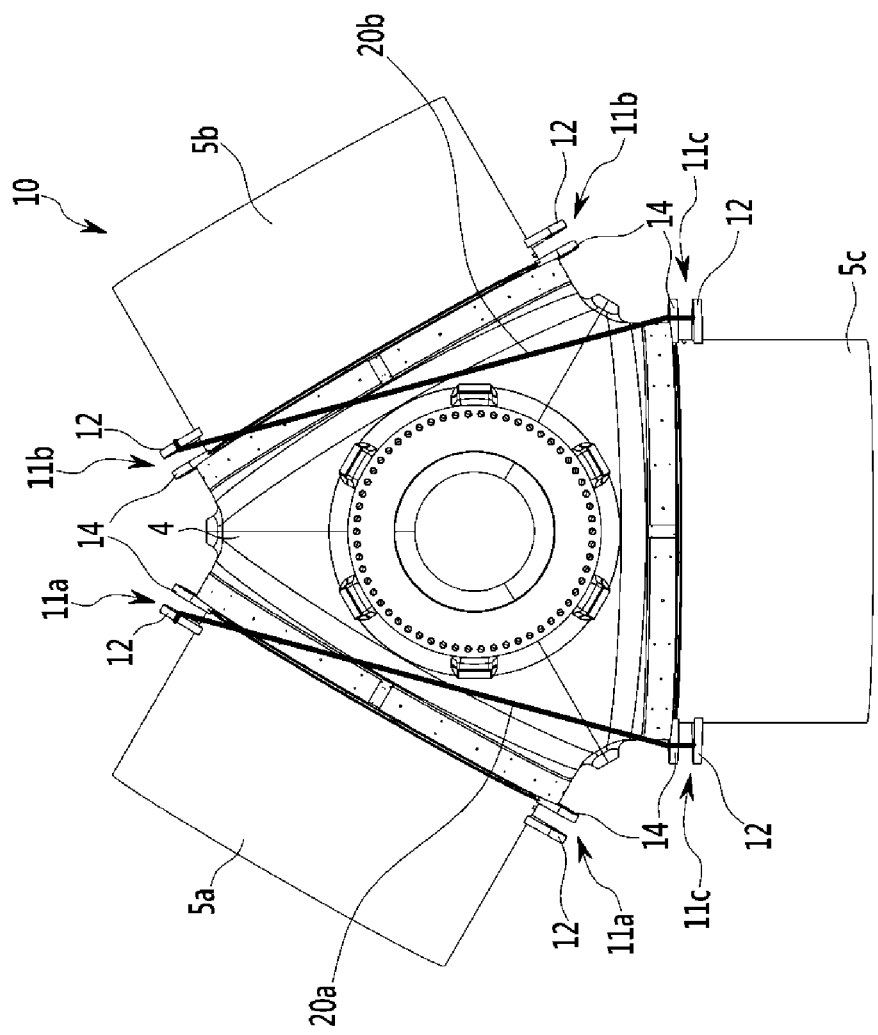
FIG. 12 to FIG. 17 are views illustrating a process of repairing pitch bearings of a wind turbine using a blade moving apparatus of the wind turbine according to an exemplary embodiment of the present invention.

According to an exemplary embodiment of the present invention, in order to repair the pitch bearing of the third blade, the first and second blades 5a and 5b are first located higher than the third blade 5c as shown in FIG. 12 (S101).

The reason why the first and second blades 5a and 5b are located higher than the third blade 5c is to make the third blade 5c hang on the first wire 20a and the second wire 20b by connecting the upper ends of the first wire 20a and second wire 20b to the first wire connector 11a of the first blade 5a and the second wire connector 11b of the second blade 5b, respectively, and connecting the lower ends of the first wire 20a and second wire 20b to the third wire connector 11c of the third blade 5c.

Referring to FIG. 12, the third blade 5c is arranged perpendicular to the bottom of the hub, and the first blade 5a and the second blade 5b located above the third blade 5c are placed bilaterally symmetrically with respect to the third blade 5c.

Once the third blade 5c is arranged perpendicular to the bottom of the hub and the first blade 5a and the second blade 5b are placed bilaterally symmetrically, the first wire 20a and the second wire 20b are connected between the first and third wire connectors 11a and 11c and between the second and third wire connectors 11b and 11c, respectively (S102).

Preferably, the first wire 20a and the second wire 20b are formed to be bilaterally symmetrical with respect to the vertical central axis of the wind turbine.

The method of connecting the first wire 20a and the second wire 20b between the first and third wire connectors 11a and 11c and between the second and third wire connectors 11b and 11c, respectively, has been described in detail with reference to FIGS. 4 to 9, so a detailed description thereof will be omitted.

Once the first wire 20a and the second wire 20b are connected between the first and third wire connectors 11a and 11c and between the second and third wire connectors 11b and 11c, respectively, the third blade 5c is removed from the hub 4 (S103).

The process of removing the third blade 5c from the hub 4 can be carried out by removing a nut 8b for coupling the third blade 5c to a pitch bearing inner ring 9b of the hub 4 from a bolt 7b.

Once the third blade 5c is removed from the hub 4, the third blade 5c remains hanging in the air by the first wire 20a and the second wire 20b.

Figure 13:
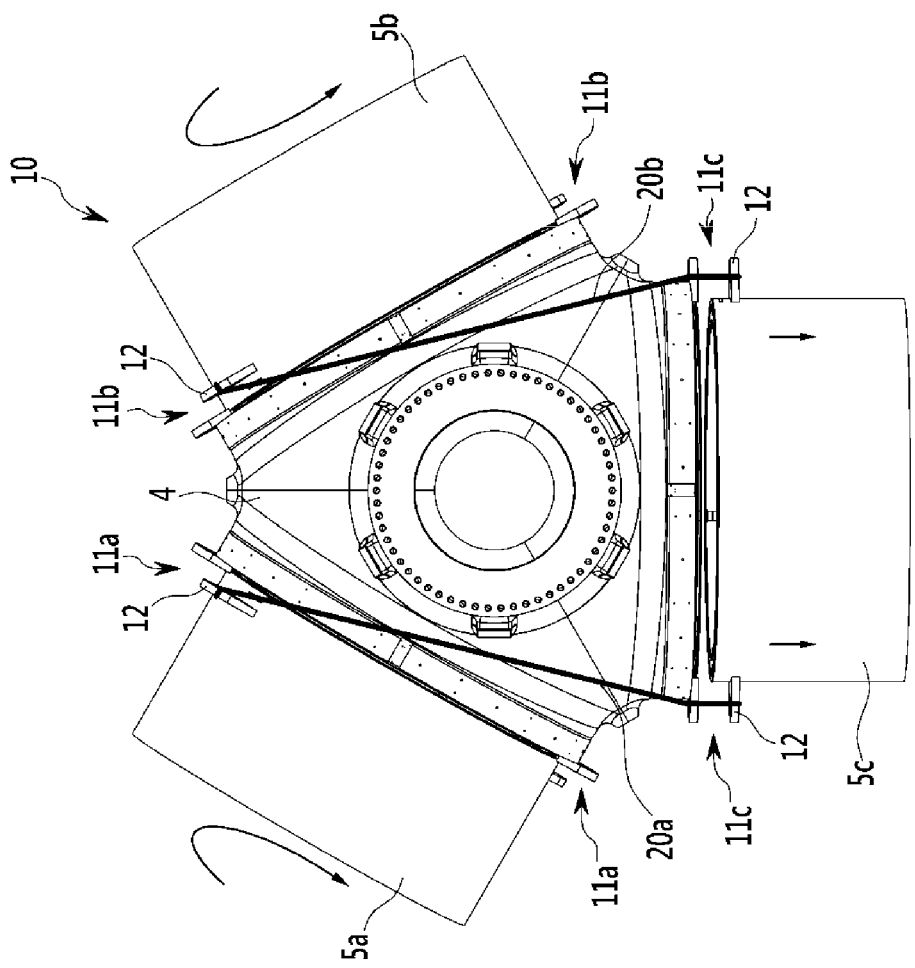

FIG. 13 depicts the third blade 5c hanging in the air by the first wire 20a and the second wire 20b. While the third blade 5c is hanging in the air by the first wire 20a and the second wire 20b, the third blade 5c is moved downward, i.e., in a direction away from the hub (S104).

Then, the pitch of the first blade 5a and second blade 5b is turned in order to move the third blade 5c downward.

Figure 14:
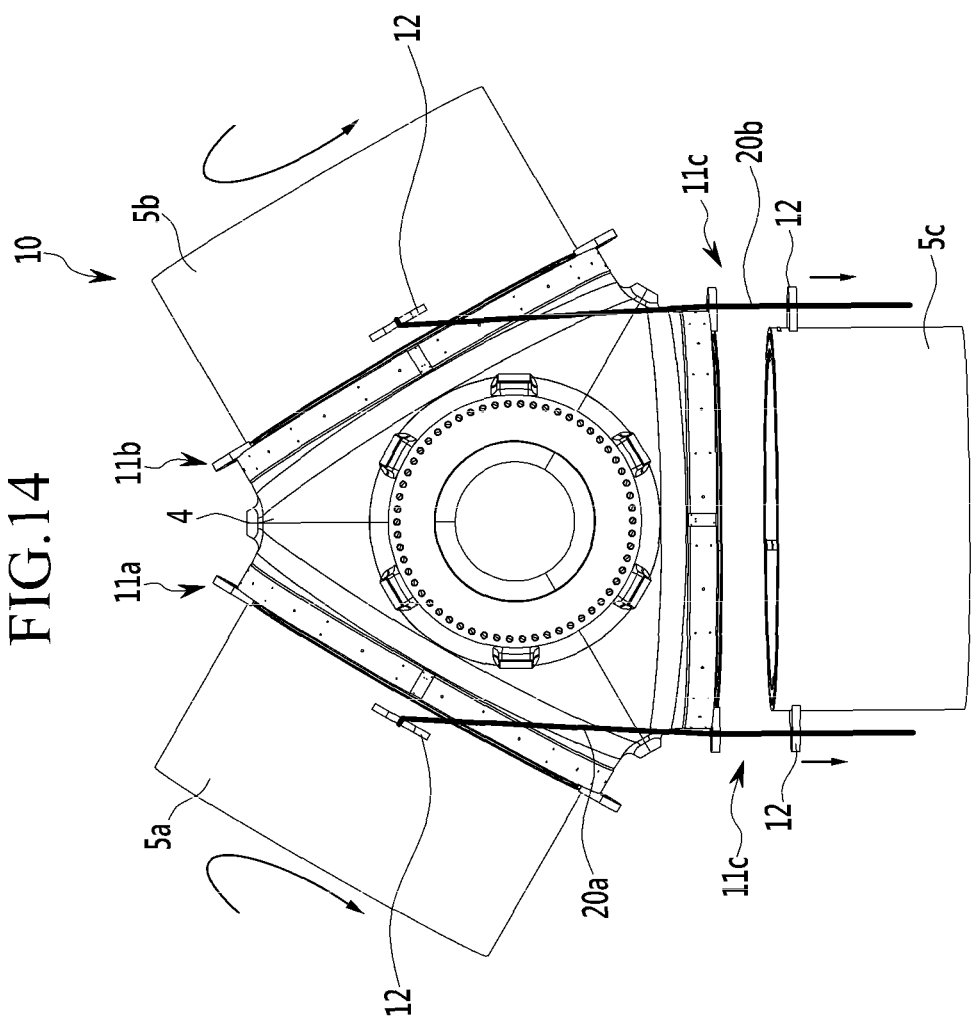

The pitch of the first blade 5a and the pitch of the second blade 5b are turned in opposite directions to move the third blade 5c downward. Referring to FIG. 14, rotating the first blade 5a clockwise and rotating the second blade 5b counterclockwise cause the third blade 5c hanging on the first wire 20a and the second wire 20b to move downward and away from the hub.

In this case, the third blade 5c only needs to be moved a short distance, not far away from the hub 4.

Figure 15:
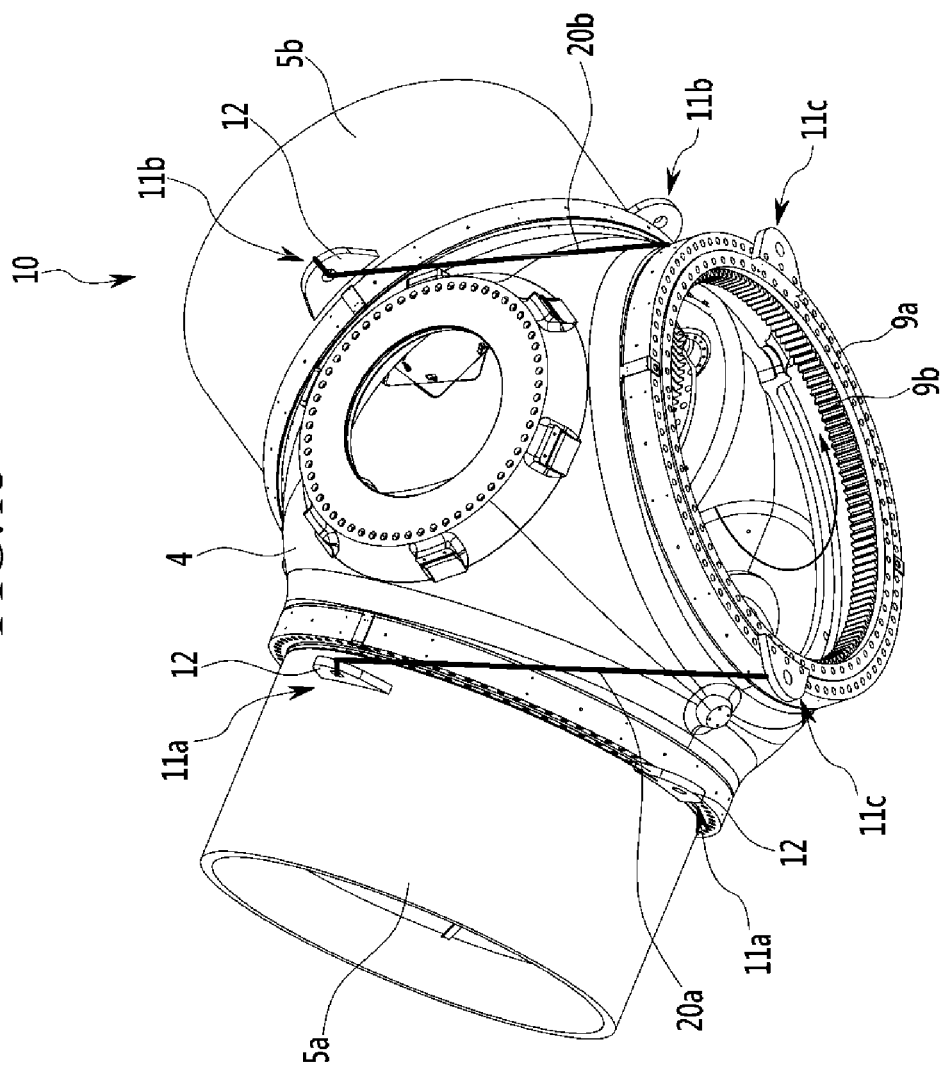

Then, while the third blade 5c is hanging on the bottom of the hub 4, the inner ring 9b of the pitch bearing for the third blade 5c installed at the hub is rotated by an inner ring gear (not shown), as illustrated in FIG. 15 (S105).

The angle of rotation of the inner ring gear may range between 90 to 270 degrees.

As the inner ring rotates, the area of contact between the inner ring gear of the pitch bearing and the inner ring of the pitch bearing is moved from the first section of the inner ring to the second to fourth sections.

Figure 16:
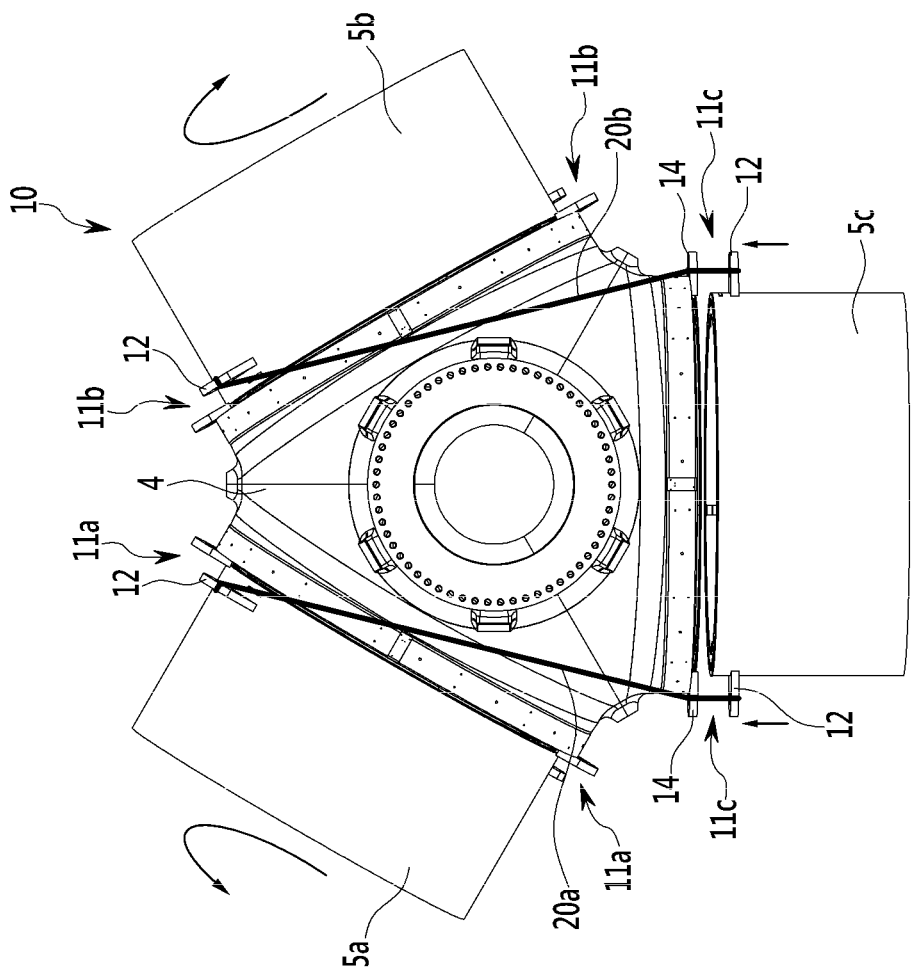

After moving the area of contact between the inner ring gear and the inner ring from the first section to other sections, the first blade 5a and the second blade 5b are rotated backward as shown in FIG. 16, thereby moving the third blade 5c back in a direction toward the hub 4 (S106).

Figure 17:
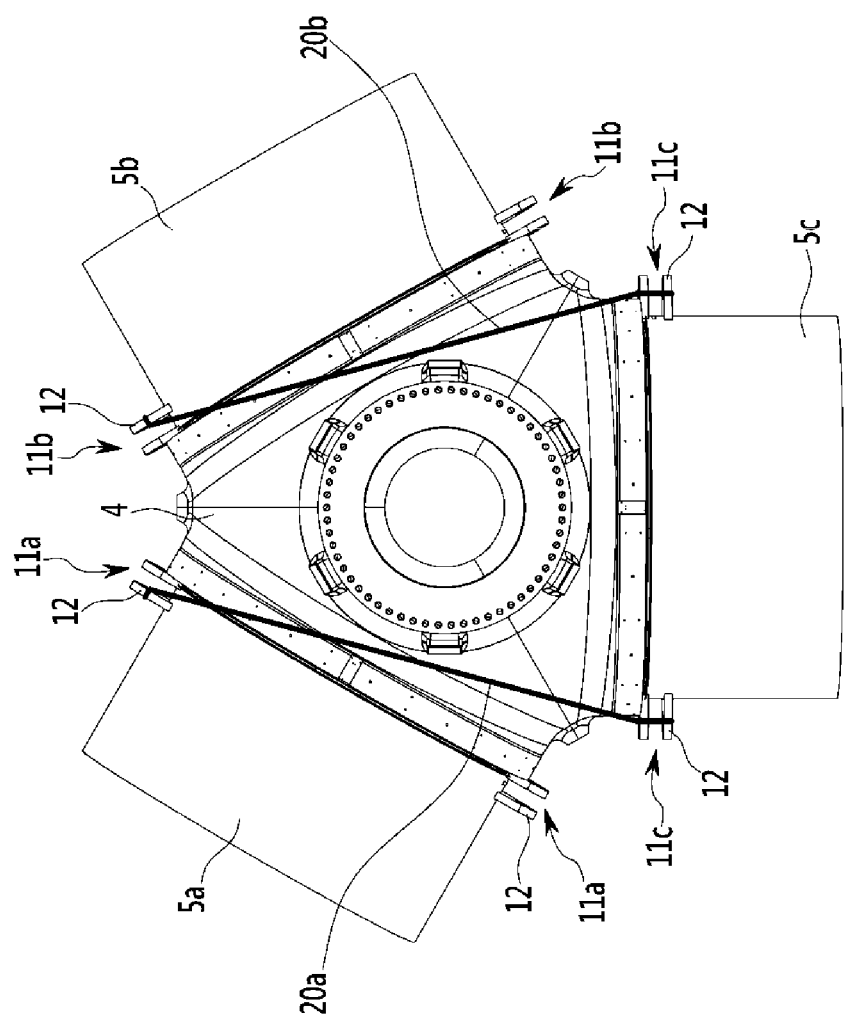

Then, as shown in FIG. 17, the third blade 5c is connected to the hub 4 (S107).

Next, the repair of the pitch bearing of the third bearing 5c is completed by removing the first and second wires 20a and 20b from between the first and third wire connectors 11a and 11c and from between the second and third wire connectors 11b and 11c (S108).

Using the blade moving apparatus of the wind turbine according to an exemplary embodiment of the present invention, the pitch bearings can be repaired while the blades are moved away from the hub, for example, while the blades are located near the hub, without being lowered to the ground where the wind turbine is installed. Therefore, the repair time of the pitch bearings of the wind turbine can be reduced and the repair procedure can be simplified.

While an exemplary embodiment of the present invention illustrates using a blade moving apparatus with wire connectors and wires for the purpose of repairing pitch bearings of a wind turbine, the blade moving apparatus according to an exemplary embodiment of the present invention may be readily used when there is a need to remove the blades for the wind turbine from the hub or when maintaining and repairing the wind turbine, apart from the embodiment described in this specification.

INDUSTRIAL APPLICABILITY

According to an exemplary embodiment of the present invention, the blades for the wind turbine can be simply and easily moved.

Moreover, the pitch bearings of the wind turbine can be simply repaired using the blade moving apparatus of the wind turbine.

The invention claimed is:

1. An apparatus for moving blades of a wind turbine having a hub and a plurality of blades installed at the hub, the plurality of blades including first to third blades, the apparatus comprising:
   first to third wire connectors, respectively, comprising first protrusions provided in a root portion of each of the first to third blades, and second protrusions provided in the hub so as to be arranged in parallel with the first protrusions; and
   a pair of wires that are attachable to and detachable from the first to third wire connectors,
   wherein each of the first protrusions has a first hole to which the pair of wires are connected, and each of the second protrusions has a second hole guiding the pair of wires.

2. The apparatus of claim 1, wherein the first protrusions are formed in pairs.

3. The apparatus of claim 2, wherein the pairs of the first protrusions are arranged at 180-degree intervals at the root portion of the each of the first to third blades.

4. The apparatus of claim 3, wherein the pairs of the first protrusions are formed on an outer or inner peripheral surface of the root portion of the each of the first to third blades.

5. The apparatus of claim 4, wherein each first hole formed in the pairs of the first protrusions are open in a direction parallel to a direction in which the each of the first to third blades extends.

6. The apparatus of claim 1, wherein the second protrusions are fixed in position on a horizontal center line of the each of the first to third blades in a direction parallel to a front of the root portion of the each of the first to third blades.

7. The apparatus of claim 6, wherein the pair of wires to be connected to the first and second wire connectors are connected to a pair of the first protrusions of the first and second wire connectors located on an upper side.

8. The apparatus of claim 6, wherein the pair of wires connected to a pair of the first protrusions of the first and second wire connectors are connected to a pair of the first protrusions of the third wire connector.

9. The apparatus of claim 6, wherein the pair of wires are adapted to pass through the second hole of the each of the second protrusions of the third wire connectors.

10. The apparatus of claim 1, wherein the pair of wires are equal in length.

11. The apparatus of claim 1, wherein the pair of wires connected between the first and third wire connectors and between the second and third wire connectors are arranged to not cross each other.

12. The apparatus of claim 1, wherein coupling loops are formed at opposite ends of the pair of wires.

13. A wind turbine comprising the apparatus of claim 1.

* * * * *